E. H. ROYER.
FENDER.
APPLICATION FILED MAR. 21, 1913.
1,093,728.
Patented Apr. 21, 1914.
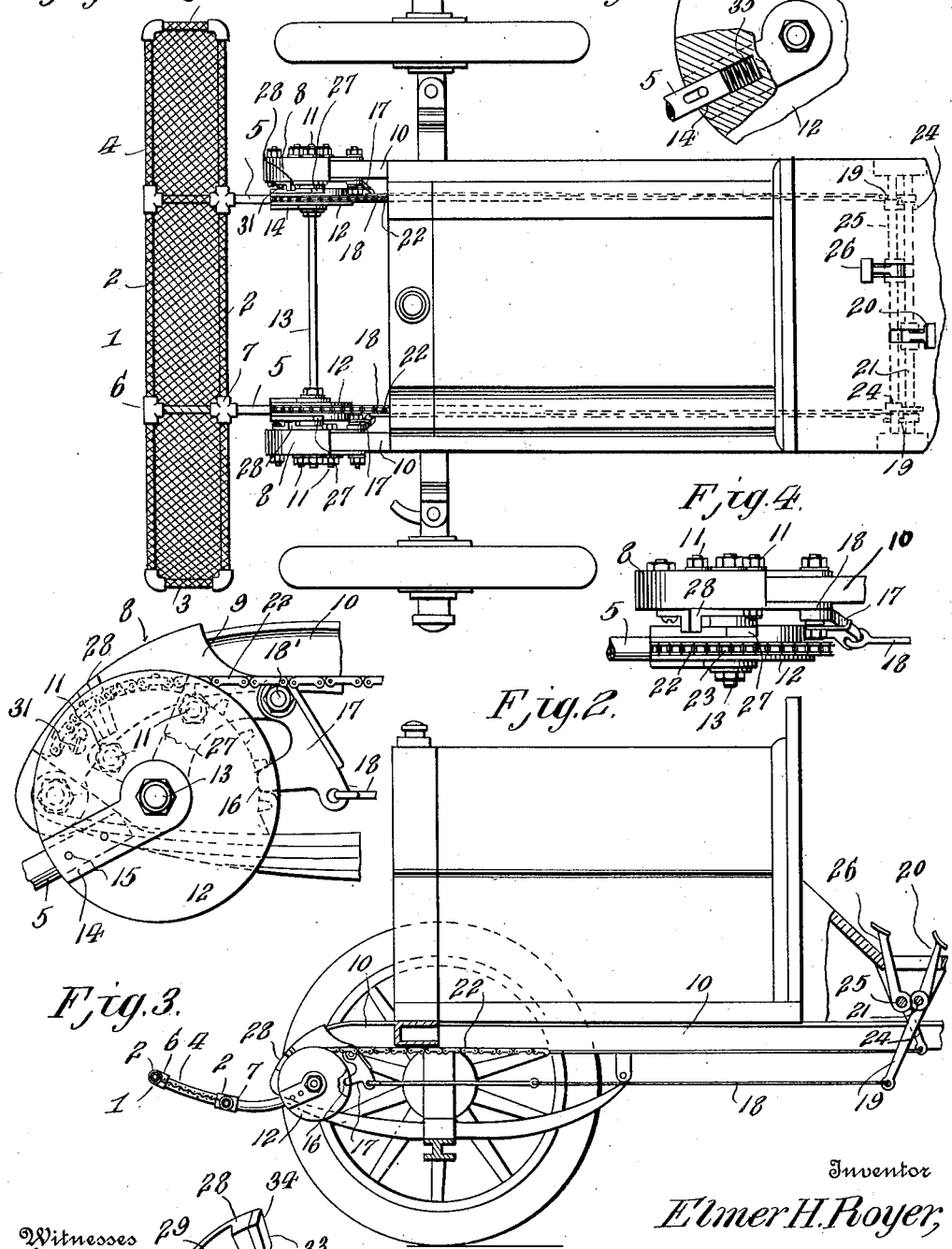
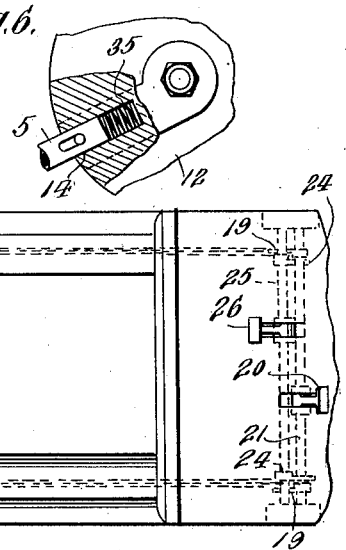
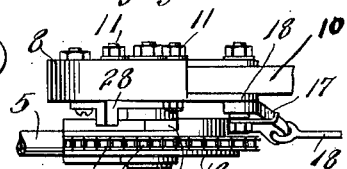
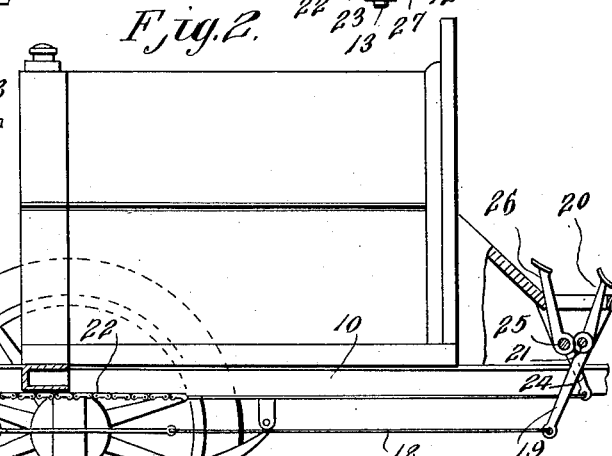
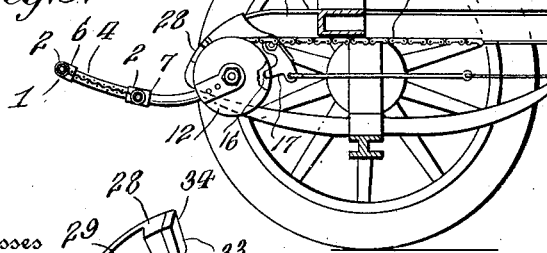
Inventor
Elmer H. Royer,
By Victor J. Evans
Attorney
Witnesses
Frank Hough.
P. M. Smith.

UNITED STATES PATENT OFFICE.

ELMER H. ROYER, OF ALTOONA, PENNSYLVANIA.

FENDER.

1,093,728.  Specification of Letters Patent.  Patented Apr. 21, 1914.

Application filed March 21, 1913. Serial No. 755,986.

*To all whom it may concern:*

Be it known that I, ELMER H. ROYER, a citizen of the United States, residing at Altoona, in the county of Blair and State of Pennsylvania, have invented new and useful Improvements in Fenders, of which the following is a specification.

This invention relates to fenders for automobiles and other mechanically propelled vehicles, the broad object of the invention being to provide a drop fender or one that is automatically moved to its lowered position by gravity when released, the fender as a whole embodying a construction which will enable it to be applied to the frame of an automobile, without piercing or altering the frame of the machine, which would impair the strength of the same.

A further object of the invention is to provide a construction of drop fender, in connection with operating means therefor, whereby the fender proper may be tripped and released, allowing the same to fall to its lowered position; the invention also involving means within reach of the operator whereby the fender may be again raised to its position of non-use; also means for limiting the downward movement of the fender, and means for adjusting the limit of downward movement of the fender.

With the above and other objects in view, the invention consist in the construction, combination and arrangement of parts, as will be hereinafter more fully described, illustrated in the accompanying drawings, and pointed out in the claims hereunto appended.

In the drawings: Figure 1 is a plan view of a sufficient portion of an automobile to illustrate the application of the improved fender thereto. Fig. 2 is a side elevation of the same. Fig. 3 is an enlarged detail side elevation showing one of the fender supporting brackets and the relation of the fender frame thereto and to the machine frame. Fig. 4 is a detail plan view of the same. Fig. 5 is a detail perspective view of the adjustable stop. Fig. 6 is a detail view, partly in section, of one of the pulleys, showing the fender arm cushioning means.

Referring to the drawings, 1 designates the frame of the fender, which, for convenience, is shown as rectangular in shape, comprising the parallel tubular bars 2 extending transversely with respect to the direction of movement of the machine, and the end bars 3 which terminally connect the parallel bars 2. The fender frame is shown as covered with mesh wire fabric 4 which is not, however, absolutely essential, as any other covering may be substituted therefor, the fender proper as a whole being adapted to be made up in any desired or preferred form. The fender frame also comprises parallel rearwardly extending arms 5, also of tubular construction, the forward ends of the bars forming said arms being extended across the fender frame, so as to connect with the parallel bars 2 thereof by means of the fittings 6 and 7.

The means for supporting the fender on the frame of the machine embodies a pair of brackets 8 having downwardly extending side plates or portions 9, said brackets embracing the forward extremities of the side bars 10 of the frame or chassis, the side plates 9 extending below the lower ends of said bars and being secured in place by clamping bolts 11 which pass through both plates 9 beneath the frame bars 10, as clearly shown in Fig. 3. Each bracket is thus firmly secured to the frame of the machine without piercing the machine frame, and thereby impairing the strength of the same. Journaled on each of said brackets is a wheel or pulley 12, the journal 13 thereof being shown, for convenience, in the form of a bolt. Each of said wheels or pulleys 12 is provided with a socket 14 adapted to receive one of the arms 5 of the fender frame, said arm being fastened therein by rivets 15, or their equivalent. At a suitable point each wheel or pulley 12 is provided with a recess 16 which, when the fender is raised, is engaged by a locking dog 17 pivotally mounted on the bracket 8, at 18'. Extending rearwardly from each dog 17 is a connecting rod or cable 18 attached at its rear end to the lower arm 19 of a trip lever 20 fast on a trip shaft 21 journaled in suitable bearings on the machine frame, the trip lever 20 being arranged within reach of the operator's foot, who, by pressing forwardly on said lever, may trip the dog 17 to release the fender and permit the same to drop. Where two wheels 12 and dogs 17 are employed, the shaft 21 will extend across the machine frame below the platform and will be provided with two arms 19, from which connections 18 will extend to the dogs 17, enabling both dogs to be simultaneously tripped.

In order to provide for again elevating the fender, after the same has been dropped, flexible connections 22 are attached at their forward extremities to the peripheries of the wheels or pulleys 12, said connections being shown, for convenience, in the form of sprocket chains, while the wheels 12 are also shown as provided with sprocket teeth 23 to be engaged by said chains. The chains or connections 22 extend rearwardly and are connected at their rear extremities to a pair of downwardly extending arms 24 on an elevating shaft 25, extending upwardly from which is a foot lever 26. The operator, by pressing forwardly on the lever 26, pulls back on the connections 22, thereby revolving the pulleys or wheels 12 sufficiently to restore the fender to its elevated position.

In order to limit the downward movement of the fender, when it is released and dropped, each wheel or pulley 12 is provided on its inner face with a stop shoulder 27, which is adapted to come into contact with a stop lug 28 arranged in the path of said shoulder and connected to the adjacent bracket 8. This stop lug is shown in detail in Fig. 5, wherein it will be noted that the lug is carried by a plate 29 having a slot 30 therein, through which passes a bolt or screw 31, by means of which the lug 28 may be adjusted, in order to give greater or less throw to the fender, said lug serving to support the fender at the proper distance above the ground. The plate 29 is provided with an inwardly extending arm 32 having at its inner end a hole 33, through which the journal 13 passes, the lug being thus adjustable around the journal 13 as a center, and when adjusted to the proper point, said lug is held by the bolt or screw 31. If desired, a cushion 34 of rubber or other suitable material may be provided on the face of the lug 28 to act as a bumper for the fender when it drops.

Instead of mounting the arms 5 of the fender frame rigidly in the sockets 14, said arms may be arranged to slide in the direction of their length in said sockets, and cushioning springs 35 may be placed in said sockets in rear of the arms 5, said springs serving to resist and take up the impact on the fender, when any person or object is struck thereby.

From the foregoing description, it will now be understood that in order to release and drop the fender, it is necessary only for one of the occupants of the front seat to kick the lever 20 forwardly, whereupon the fender is released by the withdrawal of the dog or dogs from engagement with the wheel or wheels 12. To restore the fender to its elevated position, either occupant presses forwardly on the lever 26, thereby pulling on the connections 22 which act on the wheel 12 in the manner above described. When the fender reaches its elevated position, it is locked in place by the dog or dogs, and sustained in such position until needed for further use. When in its elevated position, the fender acts as a bumper and prevents injury to the forward portion of the automobile or other vehicle, serving as a protector for the head-lamps, radiator, starting crank and the like.

What is claimed is:

1. In a fender for automobiles and the like, a pair of brackets adapted to fit over and embrace the front ends of the side frame bars of the chassis, means for clamping said brackets in place, a fender embodying rearwardly projecting arms, wheels journaled on said brackets and having the fender arms rigidly attached thereto, dogs engaging said wheels to hold the fender up, and manually controlled means for tripping the dogs and releasing the fender, permitting it to swing downwardly.

2. In a fender for automobiles and the like, a pair of brackets adapted to fit over and embrace the front ends of the side frame bars of the chassis, means for clamping said brackets in place, a fender embodying rearwardly projecting arms, wheels journaled on said brackets and having the fender arms rigidly attached thereto, a shaft connecting said wheels, dogs engaging said wheels to hold the fender up, and manually controlled means for tripping the dogs and releasing the fender, permitting it to swing downwardly.

3. In a fender for automobiles and the like, a pair of brackets adapted to fit over and embrace the front ends of the side frame bars of the chassis, means for clamping said brackets in place, a fender embodying rearwardly projecting arms, wheels journaled on said brackets and having sockets for receiving said arms, locking means for said wheels, and manually controlled means for releasing said locking means to permit the fender to swing downwardly.

In testimony whereof I affix my signature in presence of two witnesses.

ELMER H. ROYER.

Witnesses:
REXFORD M. SMITH,
BENNETT S. JONES.

Copies of this patent may be obtained for five cents each, by addressing the "Commissioner of Patents, Washington, D. C."